United States Patent [19]

Sekiguchi

[11] 3,971,896

[45] July 27, 1976

[54] TWO-TONE GENERATOR USING SWITCHING TRANSISTORS IN LC RESONANT CIRCUITS CONTROLLED BY PUSH-BUTTON

[75] Inventor: Kouichi Sekiguchi, Asaka, Japan

[73] Assignee: Iwasaki Tsushinki Kabushiki Kaisha, Japan

[22] Filed: Nov. 13, 1974

[21] Appl. No.: 523,497

[30] Foreign Application Priority Data

| Nov. 16, 1973 | Japan | 48-128315 |
| Feb. 9, 1974 | Japan | 49-15855 |
| Feb. 9, 1974 | Japan | 49-15856 |

[52] U.S. Cl. ............... 179/84 VF; 331/48; 331/117 R
[51] Int. Cl.² ............... H04M 1/50; H03B 5/12
[58] Field of Search ........... 179/84 VF, 90 K, 2 DP; 331/51, 117 R, 179, 181, 48, 56

[56] References Cited
UNITED STATES PATENTS

| 3,284,577 | 11/1966 | Burns | 179/84 VF |
| 3,424,870 | 1/1969 | Breeden | 179/84 VF |
| 3,427,569 | 2/1969 | Abramson | 331/179 |

*Primary Examiner*—Kathleen H. Claffy
*Assistant Examiner*—Joseph Popek
*Attorney, Agent, or Firm*—Robert E. Burns; Emmanuel J. Lobato; Bruce L. Adams

[57] ABSTRACT

A two tone generator using switching transistors in two LC resonance circuits each composed of a coil and a capacitor for producing a multifrequency signal in the form of two-tone signal by switching the value of the inductances of the coils in response to the control of push-button switches, in which only one make contact is actuated in response to the depression of each push button, so that the ON-OFF output of the contact is employed to control selected ones of switching transistors in each of the two resonance circuits for determining the oscillation frequencies of a two-tone oscillator associated with the two LC resonance circuits. The switching transistors comprises a first group of either NPN transistors or PNP transistors and a second group of NPN transistors or PNP transistors. The switching transistors are coupled with the two LC resonance circuits to switch the value of the inductance of each coil in response to the turning ON of the collector-emitter path thereof. Each of the switching transistors is turned-ON by flowing a base current more than the peak value of the AC signal developed in the resonance circuit without flowing any DC current in the collector-emitter path thereof.

4 Claims, 7 Drawing Figures

Fig.1

TWO-TONE GENERATOR USING SWITCHING TRANSISTORS IN LC RESONANT CIRCUITS CONTROLLED BY PUSH-BUTTON

This invention relates to a two-tone generator using switching transistors in two LC resonance circuits each composed of a coil and a capacitor for producing a multifrequency signal in the form of a two-tone signal by switching the value of the inductances of the coils in response to the control of a plurality of push-button switches.

In a conventional push-button dial device including the two-tone generator, such as employed in usual key telephone sets in Japan, an oscillator has many mechanical contacts which are opened and closed by depression of corresponding push-buttons and which are turned-ON and -OFF in a gang manner, thereby to select oscillation frequencies and to control the starting of oscillation thereof. Namely, a contact employed for starting the oscillator supplies a current therethrough to the oscillator upon depression of a push-button. Moreover, other contacts are employed to select predetermined oscillation frequencies. In this manner, oscillation is achieved at desirable frequencies by the depression of a push-button corresponding to desired one of the dial numbers 1, 2, 3, . . . 9, 0, etc.

Such a conventional push-button dial device requires the control of a plurality of (usually three) contacts, and hence involves the use of a complicated gang mechanism, which results not only in an increased force for depressing the push-buttons but also in troubles.

The inventor of this invention already proposed a two-tone generator using switching transistors capable of overcoming the above-mentioned defects resulting from the use of the ganged contacts but using a minimum number of mechanical contacts. (See. USP Application Ser. No. 439,985; British Patent Application No. 5862/74; German Patent Application No. P 2406071.7; and Brazilian Patent Application No. 952/P-74.)

In the prior application, only one make contact is actuated in response to the depression of each push-button, and the ON-OFF condition of the contact is employed to control desired switching transistors for determining the oscillation frequencies of the two-tone generator.

However, since a diode matrix is employed in the device proposed by the prior application to ON-OFF control of the switching transistors, the device proposed by the prior application has such disadvantages as an increase of the necessary space, increase of the cost, and lowering of the reliability due to increase of parts.

An object of this invention is to provide a similar two-tone generator using switching transistors in LC resonant circuits controlled by a push-button dial but without using a diode matrix.

The principle, construction and operations of this invention will be clearly understood from the following detailed description taken in conjunction with the accompanying drawings, in which.

Figure 1:
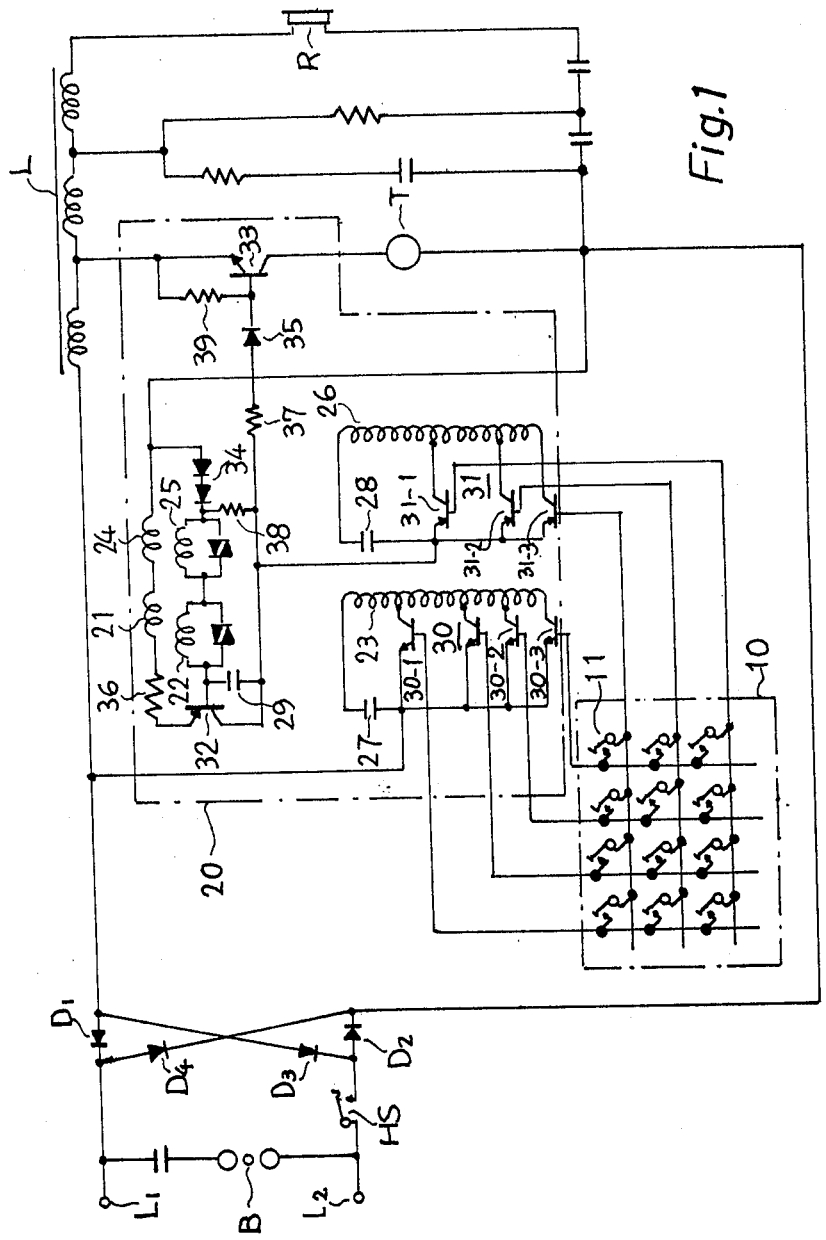
FIG. 1 is a circuit diagram illustrating an example of this invention.

With reference to FIG. 1, an example of this invention will be described. Reference numeral 10 indicates push-button switches, which are provided with a plurality of contacts 11. Reference numeral 20 designates an oscillator, which comprises coils 21, 22 and 23 and coils 24, 25 and 26 respectively forming a three-winding transformer, capacitors 27, 28 and 29, transistor groups 30 and 31, transistors 32 and 33, diodes 34 and 35 and resistors 36, 37, 38 and 39. In comparison of this circuit with a conventional circuit, the former is different from the latter in that the contacts are replaced by the transistors and in that the push-button switches 10 are provided for controlling the transistors. The oscillator in the former corresponds to the push-button switches 10 and the oscillator 20 in FIG. 1.

Next, the operation of the circuit of FIG. 1 will be described. Assuming that the right, uppermost contact 11 of the push-button switches 10 is turned ON and that, at this time, positive and negative DC voltages are applied to the external terminals $L_2$ and $L_1$ respectively, a current flowing between the bases and the emitters of the lowermost transistors 30-3, 31-3 of the transistor groups 30 and 31 follows through a path: the external terminal $L_2$ — the hook switch HS — the diode $D_2$ — the diode 34 — the resistor 38 — the lowermost transistor 31-3 of the transistor group 31 — the contact 11 — the lowermost transistor 30-3 of the transistor group 30 — the diode $D_1$ — the external terminal $L_1$, and through another path: the external terminal $L_2$ — — the hook switch HS — the diode $D_2$ — the coil 24 — the coil 21 — the resistor 36 — the transistor 32 — the lowermost transistor 31-3 of the transistor group 31 — the contact 11 — the lowermost transistor 30-3 of the transistor group 30 — the diode $D_1$ — the external terminal $L_1$. As a result of this, the oscillator 20, which is formed by the diode 34, the resistor 38, the coils 24 and 21, the resistor 36, the transistor 32, etc., is supplied with a current sufficient for oscillation. On the other hand, by flowing a direct current between the bases and emitters of the transistor groups 30 and 31, they are turned ON across their base-emitter paths to provide conductive paths for an alternating current as described below.

Thus, the aforesaid oscillator 20 oscillates at frequencies determined by the coils 23 and 24 and the capacitors 27 and 28.

Further, when the aforementioned contact 11 is in the OFF state, a current is flowing in the base of the transistor 33 through a path: the external terminal $L_2$ — the hook switch HS — the diode $D_2$ — the diode 34 — the resistor 38 — the resistor 37 — the diode 35 — the base-emitter path of the transistor 33 — the coil L — the diode $D_1$ — the external terminal $L_1$, and through a path: the external terminal $L_2$ — the hook switch HS — the diode $D_2$ — the coils 24 and 21 — the resistor 36 — the transistor 32 — the resistor 37 — the diode 35 — the base-emitter path of the transistor 33 — the coil L — the diode $D_1$ — the external terminal $L_1$. Thus, the transistor 33 is turned ON across its emitter-collector path to supply a current to the transmitter T.

By turning ON the right, uppermost contact 11 in the above condition, the current flowing in the resistor 37 from the resistor 38 or the transistor 32 is by-passed through a path: the emitter-base path of the lowermost transistor 31-3 of the transistor group 31 — the contact 11 — the base-emitter path of the lowermost transistor 30-3 of the transistor group 30. Accordingly, flowing of the current in the resistor 37 is stopped, so that the transistor 33 is turned OFF at its collector-emitter path to stop the current to the transmitter T.

Figure 2:
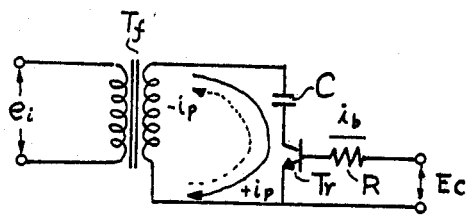
FIG. 2 is a circuit diagram explanatory of the operations of a switching circuit employed in this invention.
Figure 3:
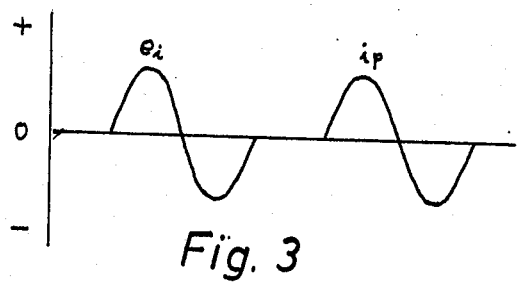
FIG. 3 is a waveform diagram explanatory of the operations of the circuit shown in FIG. 2.

Referring now to FIGS. 2 and 3, a description will be made of the operation that the transistor groups 30 and 31 are turned ON in such a condition.

In FIG. 2, a reference character Tf indicates a transformer; C designates a capacitor; R identifies a resistor; Tr represents a transistor; $e_i$ denotes an input AC signal voltage; $i_p$ and $-i_p$ show AC signal currents flowing in an LC resonance circuit in response to the input AC signal voltage $e_i$; and $i_b$ represents a base current flowing through the base-emitter path of the transistor Tr in response to the control voltage Ec.

Figure 4:
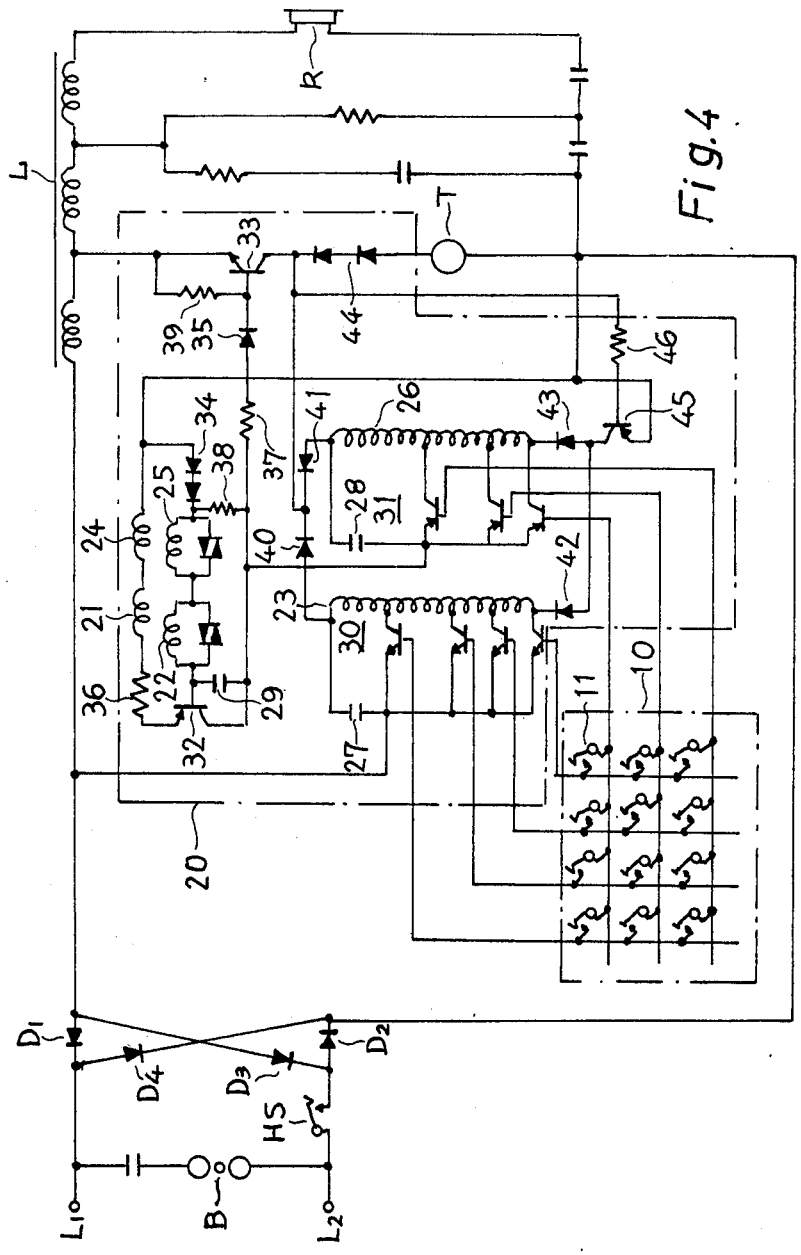
FIGS. 4, 5, 6 and 7 are circuit diagrams each illustrating another example of this invention.

The operations of the circuit shown in FIG. 2 will be described with reference to the waveforms of FIG. 3, which shows the relationship between the input AC signal voltage $e_i$ and the AC signal current $i_p$ flowing through the secondary winding of the transformer Tf, the capacitor C and the transistor Tr when the base current $i_b$ of the transistor Tr is varied. If the base current $i_b$ is established at a value more than the peak value of the AC signal current $i_p$, it is possible to flow the AC signal current $i_p$ in proportion to the input AC signal voltage $e_i$ as shown in FIG. 4. In this case, the circuit loop for flowing therethrough the AC signal current $i_p$ forms a closed loop.

In a case where the AC signal current $i_p$ flows in the direction $+i_p$, the transistor Tr performs its normal operation and the relation that $i_p = h_{fe} \cdot i_b$ is established. In this case, the relation that $i_1 \geq i_p$ is satisfied and the current amplification factor $h_{fe}$ usually has a value of several tens, so that the transistor Tr becomes conductive.

On the other hand, if the AC signal current flows in the direction $-i_p$, the base current $i_b$ is shunted in proportion to the increase in the AC input signal voltage $e_i$ according to the diode characteristic provided at the base-collector path of the transistor Tr, whose base and collector correspond to an anode and a cathode respectively. The increase in the collector voltage in the negative direction results in making the base potential negative and, apparently, the current $-i_p$ flows through the transistor Tr. Namely, the transistor Tr is turned-ON. Furthermore, if the base current $i_b$ flowing through the base-emitter path is zero, the transistor Tr is the OFF-state as known.

Thus, the transistor groups 30 and 31 are turned-ON in response to their base currents applied through the push-button switches 10 as shown in FIG. 1. Moreover, a closed loop is formed so that the LC resonance circuit formed by the coil 23 and the capacitor 27 and the LC resonance circuit formed by the coil 26 and the capacitor 28 can be resonant with respective, predetermined frequencies.

The above has been described for the case of turning-ON the rightmost one of the contacts 11 of the push-button switches 10. In the case of turning-ON any other contact, the current supplied to the transmitter T is switched to the oscillator by the switching actions of the transistors 30 and 31 and, on the other hand, the transistor groups 30 and 31 are turned-ON to determine oscillation frequencies corresponding to the selected one of the contacts 11. Thus, the oscillator starts to provide a required combination of two tone signals of different frequencies.

Upon turning-OFF of the contact 11, the supply of the base current to the transistors 30, 31 is cut off to turn them OFF, and the oscillation is stopped by the operation reverse to that described above so that a current is supplied to the transmitter T to allow the talking operation.

Another example of this invention will be described below with reference to FIG. 4, in which the rise time of the oscillation output of the oscillator is made shorter than the example shown in FIG. 1. In FIG. 4 two sets of diodes 40, 41 and 42, 43 are further connected between respective ends of the two coils 23 and 26 of the example shown in FIG. 1. Moreover, a transistor 45 is connected to terminals of one set 42, 43 of the two sets of diodes 40, 41 and 42, 43 opposite to the coils 23, 26 so as to assume an ON-state at the open state of the push-button switches 10 to supply a direct current to the two LC resonant circuits 23, 27 and 26, 28. Reference 46 identified the base resistor of the transistor 45, and reference 44 shows diodes. It is well-known that energy is stored in an LC resonance circuit by flowing a direct current in coil L thereof so that, when the oscillation is to be started, the LC resonance circuit is excited by the stored energy, thereby to speed up the starting of the oscillation. The example of this invention shown in FIG. 4 is proposed to provide structure for speeding up the starting of the oscillation of the push-button dial device under the principle mentioned above. Namely, circuits elements 40 to 46 constitute this structure.

The operation of the example of FIG. 4 will hereinbelow be described including the operation of the structure for speeding up the start of oscillation. In the illustrated condition in which the push-button switches 10 are not pressed, the transistor 33 is in its ON state as described previously. Accordingly, the base current of the transistor 45 flows in a path: the external terminal $L_2$ — the hook switch HS — the diode $D_2$ — the emitter-base path of the transistor 45 — the resistor 46 — the collector-emitter path of the transistor 33 — the coil L — the diode $D_1$ — the external terminal $L_2$. Consequently, the transistor 45 is turned ON at its emitter-collector path. As a result of this, when the push-button switches 10 are not depressed, a direct current caused by the DC voltage applied across the external terminals $L_1$ and $L_2$ flows through a path: the external terminal $L_2$ — the hook switch HS — the diode $D_2$ — the emitter-collector path of the transistor 45 — the diode 42 — the coil 23 — the diode 40 — the collector-emitter path of the transistor 33 — the coil L — the diode $D_1$ — the external terminal $L_1$, and through a path: the external terminal $L_2$ — the hook switch HS — the diode $D_2$ — the emitter-collector path of the transistor 45 — diode 43 — the coil 26 — the diode 41 — the collector-emitter path of the transistor 33 — coil L — the diode $D_1$ — the external terminal $L_1$. Namely, since the direct current flows in the coils 23 and 26, energy is stored therein. The diode 44 is employed for providing a potential difference sufficient to by-pass the current to the coils 23 and 26, and it may be replaced by a resistor. Further, it may be eliminated in a case where a sufficient potential difference is developed across the transmitter T.

Upon depressing the push-button switches 10 in such a condition, a selected one of the contacts 11 is closed to turn OFF the transistor 33 at its collector-emitter path by the above-mentiond operation. Accordingly, a route in which the base current of the transistor 45 is flowed is cut off, thus turning OFF the transistor 45 at its emitter-collector path. As a result of this, the structure including the diodes 41, 42 and 43 viewed from the coils 23 and 26 peerforms the same function as a known rectifier bridge circuit, and it is regarded that the collector-emitter path of the transistor 45 is connected as a load of the circuit. In this case, the transistor 45 is turned OFF at its emitter-collector path as described previously and its AC impedance becomes high. Consequently, the AC impedances across the coils 23 and 26 become high to enable oscillation. At the same time as the oscillation becomes possible as described above, the transistors of the transistor groups 30 and 31 are turned ON by the energy stored in the coils 23 and 26 as mentioned previously to form LC resonance circuits with the coil 23 and the capacitor 27 and the coil 26 and the capacitor 28, respectively. The circuits are thus put in their resonating state to produce outputs therefrom. Accordingly, this decreases the absorption of energy by the LC resonance circuits when the power source is connected to the oscillator, thereby to make the rise in oscillations sharp.

Figure 5:
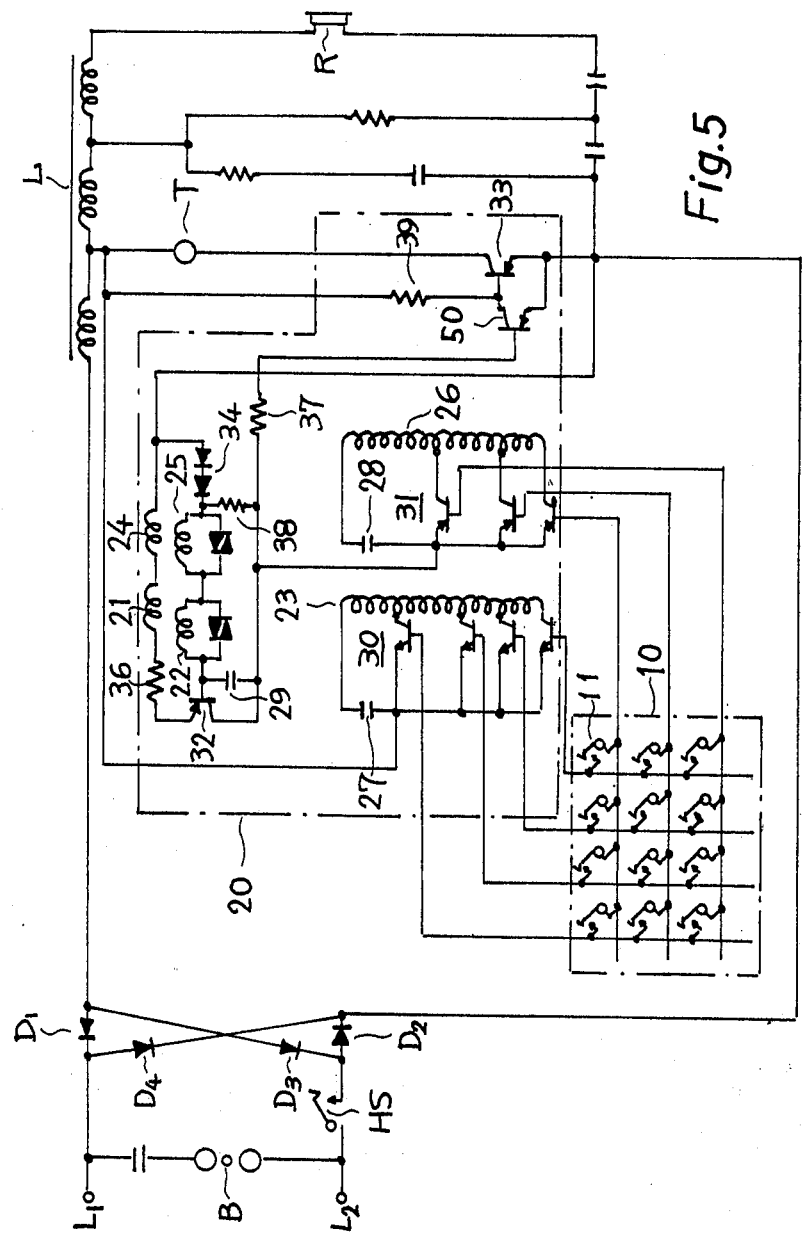

Next, another example of this invention is shown in FIG. 5, in which reference numeral 50 indicates a transistor. The examples of FIGS. 1 and 5 are different from each other in the control function for the transistor 33. Namely, in the example shown in FIG. 1, since the base current for turning-ON the transistor 33 is supplied through the oscillator circuit, so that is is necessary to set the transistor 33 base current in such a range that the oscillator is not actuated thereby. In the example shown in FIG. 5, however, the base current for turning-ON the transistor 33 is supplied through the resistor 39 and the current to the oscillator 20 flows only when one of the push-button switches 10 is depressed. Accordingly, the aforementioned setting of the base current such as in the example shown in FIG. 1 is not required, so that the oscillator is stabilized.

The operation of the example shown in FIG. 5 will hereinbelow be described. The oscillating operation of the oscillator 20 is similar to that of FIG. 1. While the contact 11 of the push-button switches 10 is in its OFF state, a current flows in the base of the transistor 33 through a path: the external terminal $L_2$ — the hook switch HS — the diode $D_2$ — the emitter-base path of the transistor 33 — the resistor 39 — the coil L — the diode $D_1$ — the external terminal $L_1$. Further, a transistor 50 is in its OFF-state and the transistor 33 is thereby turned ON at its emitter-collector path to supply a current to the transmitter T. Upon closing the right, uppermost contact 11 of the push-button switches 10 in such a condition, the current flowing across the emitter-base path of the transistor 50 flows through a path: the external terminal $L_2$ — the hook switch HS — the diode $D_2$ — the emitter-base path of the transistor 50 — the resistor 37 — the base-emitter path of the lowermost transistor 31-3 of the transistor group 31 — the contact 11 — the base-emitter path of the lowermost transistor 30-3 of the transistor group 30 — the coil L — the diode $D_1$ — the external terminal $L_1$. As a result of this, the transistor 50 is turned ON at its collector-emitter path and the transistor 33 is turned OFF at its collector-emitter path, thus cutting OFF the current supply to the transmitter T.

Figure 6:
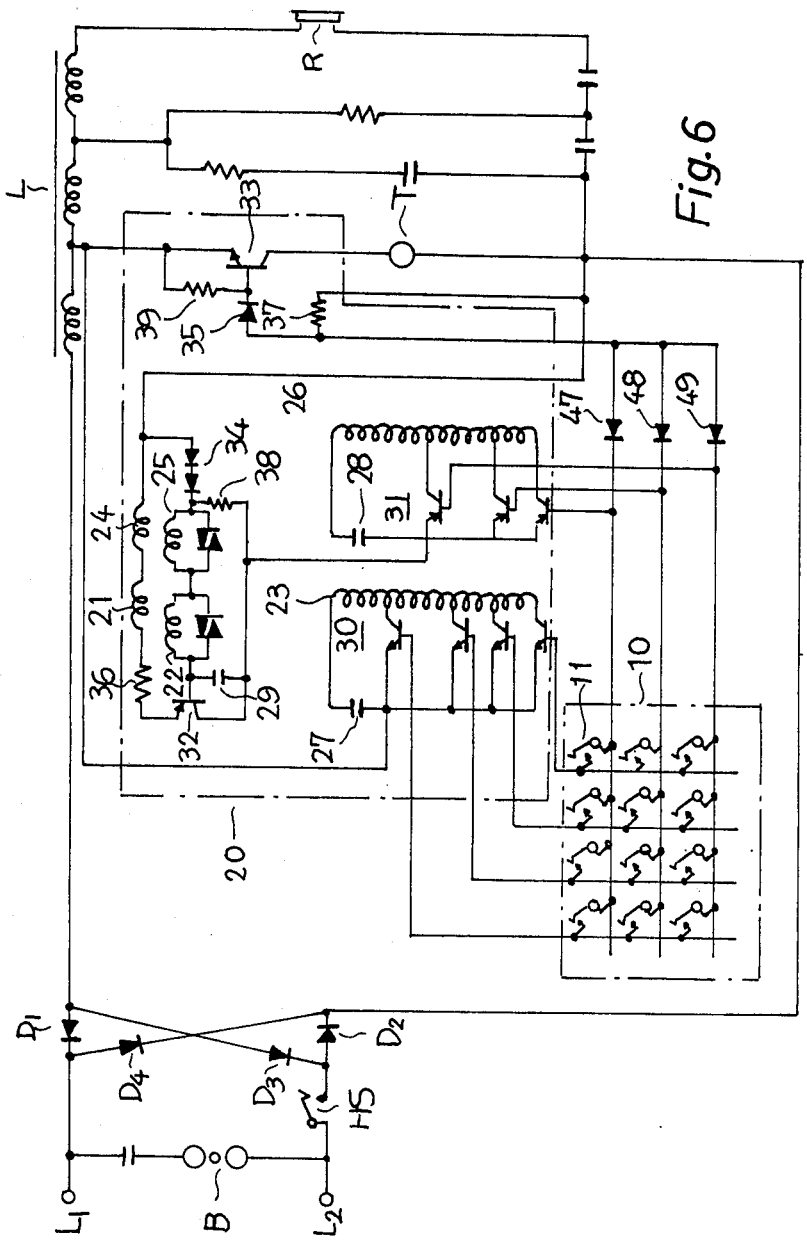
Figure 7:
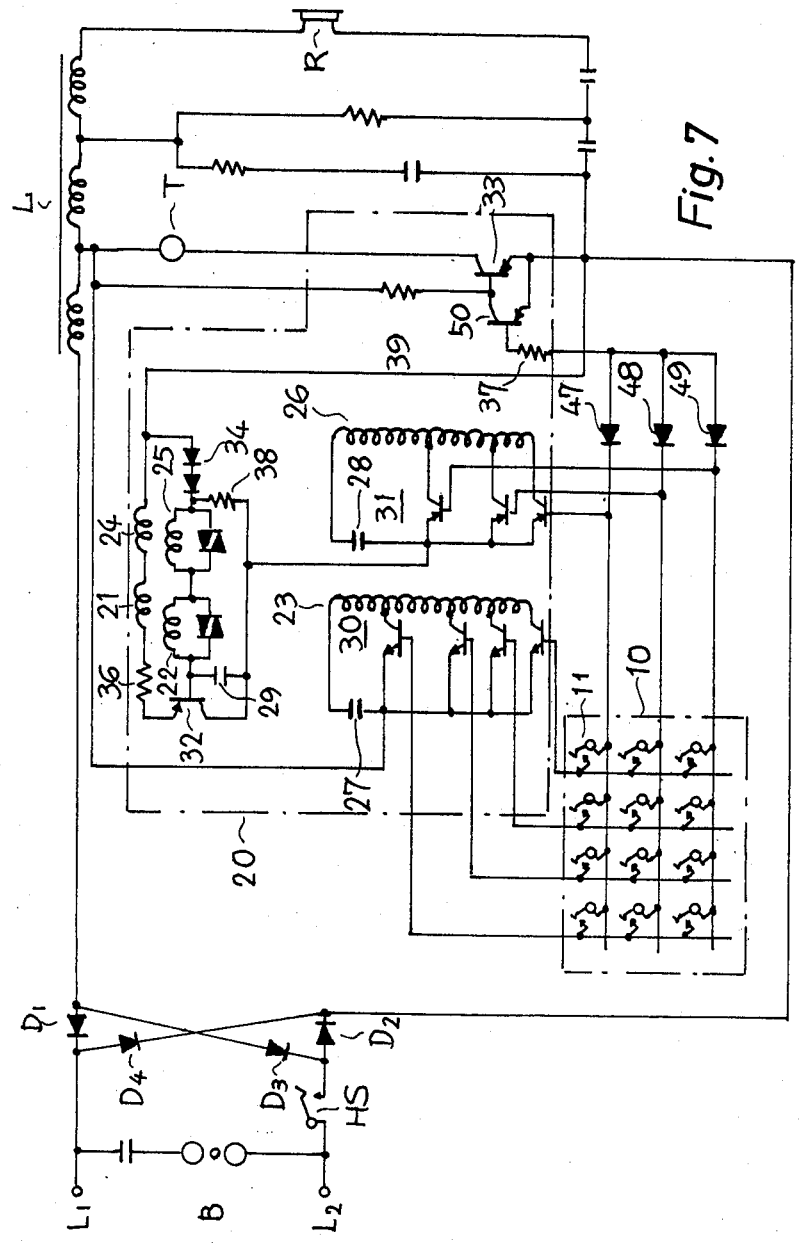

FIGS. 6 and 7 illustrate other examples of this invention. In FIGS. 6 and 7, reference numerals 47, 48 and 49 designate diodes. The examples of FIGS. 1 and 5 make use of the diode characteristics of the transistors of the transistor groups 31 at their emitter-base paths, but the examples of FIGS. 6 and 7 employ the diodes 47, 58 and 49 as separated parts while their operations are the same as those previously described in connection with FIGS. 1 and 5. However, unlike to the example of FIG. 1, the base current for turning ON the transistor 33 is supplied through a path: the external terminal $L_2$ — the hook switch HS — the diode $D_2$ — the resistor 37 — the diode 35 — the base-emitter path of the transistor 33 — the coil L — the diode $D_1$ — the external terminal $L_1$.

As described in detail above, the gang-mechanism of the push-button swtiches, which is an important cause of troubles in the prior art, is effectively removed in accordance with this invention, and only by closing one of the contacts of the push-button switches, the oscillation of two tone signals of two different frequencies can be achieved to transmit a tone multifrequency signal. These remarkably enhance the reliability of the oscillator, decrease the force for depressing the push button and reduce the size of the overall construction by elimination of a diode matrix. Furthermore, the contacts of the switches are inserted in the AC signal loop of the oscillator in the conventional push-button dial device, so that the leadingout of a signal from the contacts for other purpose, such as for lighting an indicator, greatly deteriorates the performance of the oscillator. In the present invention, however, no AC coupling exists between the contacts of the push-button switches and the oscillator, so that even if a signal is led out from the contacts for any other purposes, no influence is exerted on the oscillator. Moreover, since DC currents are supplied to the coils of the LC resonance circuits through the diodes and the switching elements, the rise time of the oscillation can be effectively shortened. With such merits as described above, this invention can be also applied to various other devices, such as a data input device in which its contents are displayed by indicator tubes by depressing push-button switches and, at the same time, transmitted in the form of a multifrequency signal.

What I claim is:
1. A tone generator, for producing a multifrequency signal in the form of two selectable tone signals, comprising:
   a two-tone oscillator having two LC resonance circuits each comprised of a coil and a capacitor;
   a plurality of switching transistors having the collector-emitter paths thereof coupled to corresponding ones of said two resonance circuits to switch the values of the inductances of the coils in response to the turning ON of the collector-emitter paths, said switching transistors comprising a first group of NPN transistors having their respective collector-emitter paths each connected in common between the capacitor and respective taps progressively along the coil comprising a first of said resonance circuits, and a second group of PNP transistors having their respective collector-emitter paths each connected in common between the capacitor and respective taps progressively along the coil comprising the second of said resonance circuits;
   a plurality of switches individually controllable and each having a contact connected in series between the bases of a respective pair of transistors one of which is respectively included in the first group and one in the second group; and current means electrically coupled to said switching transistors for flowing, in the base-emitter paths of respective selected ones of said switching transistors of the two LC resonance circuits, base currents greater than the peak values of respective AC currents developed in the two LC resonance circuits to turn-ON said selected ones of said switching transistors and switch the inductances of said coils thereby to select the tones developed by said oscillator, said selected switching transistors being selected by closure of the contact of a selected one of the switches to electrically connect their bases and complete a flow path for the current supplied by said current means.

2. A tone generator according to claim 1, further including:

means for supplying a direct current to said two-tone oscillator through the base-emitter path of each transistor of the first group of transistors, the base-emitter path of each transistor of the second group of transistors, and one contact of said push-button switches upon closure thereof.

3. A tone generator according to claim 1, further including;

two sets of diodes respectively connected to both ends of said coils of said two LC resonance circuits; and a transistor connected to terminals of one set of the two sets of diodes opposite to the coils so as to assume an ON-state the contacts of the push-button switches to supply a direct current to the two LC resonance circuits.

4. A tone generator according to claim 1, further including:

means for supplying a direct current to said two-tone oscillator through a series connection comprising the base-emitter path of each of the first group of transistors, the base-emitter path of each of the second group of transistors, and one contact of said push-button switches; and a transistor switching circuit connected in series with said series connection to supply a direct current to a transmitter arranged in series with said series connection so that said transistor switching circuit is controlled by a voltage change caused in response to ON-OFF operation of the contacts of the push-button switches.

* * * * *